(12) United States Patent
Menzel, Jr.

(10) Patent No.: US 12,715,677 B2
(45) **Date of Patent: *Aug. 25, 2026**

(54) INSULATED CONTAINER

(71) Applicant: Airlite Plastics Co., Omaha, NE (US)

(72) Inventor: Robert William Menzel, Jr., Mooresville, NC (US)

(73) Assignee: Airlite Plastics Co., Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/223,593

(22) Filed: May 30, 2025

(65) Prior Publication Data

US 2025/0289646 A1 Sep. 18, 2025

Related U.S. Application Data

(60) Continuation of application No. 18/667,637, filed on May 17, 2024, which is a continuation of application (Continued)

(51) Int. Cl.

*B65D 81/38* (2006.01)
*B32B 37/18* (2006.01)
*B65D 65/46* (2006.01)

(52) U.S. Cl.

CPC .......... *B65D 81/3858* (2013.01); *B32B 37/18* (2013.01); *B65D 65/466* (2013.01);

(Continued)

(58) Field of Classification Search

CPC ........................................ B65D 81/3848–3862

(Continued)

(56) References Cited

U.S. PATENT DOCUMENTS 1,942,917 A * 1/1934 D Este .................. B65D 31/04 383/110
3,747,743 A 7/1973 Hoffmann, Jr.

(Continued)

FOREIGN PATENT DOCUMENTS

CA 2637426 C 9/2014
CA 3024714 C 6/2019

(Continued)

OTHER PUBLICATIONS

US 11,040,817 B2, 06/2021, Ptratt (withdrawn)

(Continued)

*Primary Examiner* — Nathan J Newhouse
(74) *Attorney, Agent, or Firm* — Banner & Witcoff, Ltd.

(57) ABSTRACT

An insulator for installation inside a container may include an insulation layer including a plurality of insulation pads configured to be arranged in an operating position inside the container, such that each of the insulation pads has a contact surface configured to face inward toward contents of the container when installed inside of the container in the operating position, and a covering layer including a plurality of cover members covering at least the contact surfaces of the insulation pads. The covering layer permits cotton fiber material of the insulation pads to be exposed to an environment within the container and permits fluid within the container to bypass the covering layer to contact the material. Each insulation pad has an outer surface opposite the contact surface, and the covering layer further covers the outer surfaces of the insulation pads.

25 Claims, 16 Drawing Sheets

Related U.S. Application Data

No. 15/977,520, filed on May 11, 2018, now abandoned, which is a continuation of application No. PCT/US2018/032101, filed on May 10, 2018, and a continuation-in-part of application No. 15/959,801, filed on Apr. 23, 2018, now Pat. No. 10,246,236, and a continuation-in-part of application No. 35/001,475, filed on Dec. 22, 2017 (U.S. filing date under 35 U.S.C. 384), and having an international filing date of Dec. 22, 2017, now Pat. No. Des. 864,721, and a continuation-in-part of application No. PCT/US2017/018461, filed on Feb. 17, 2017, said application No. 15/959,801 is a division of application No. 15/436,417, filed on Feb. 17, 2017, now Pat. No. 10,112,756.

(60) Provisional application No. 62/609,102, filed on Dec. 21, 2017, provisional application No. 62/338,136, filed on May 18, 2016.

(52) U.S. Cl.
CPC ...... *B65D 81/3862* (2013.01); *B32B 2439/62* (2013.01); *B32B 2439/80* (2013.01); *Y02W 90/10* (2015.05)

(58) Field of Classification Search
USPC ............... 229/103.11, 905–906; 220/592.25, 220/592.26
See application file for complete search history.

(56) References Cited

U.S. PATENT DOCUMENTS

| | | | | |
|---|---|---|---|---|
| 4,497,088 | A | 2/1985 | Lehman | |
| 5,022,316 | A * | 6/1991 | Hellwig | B65B 27/083 206/83.5 |
| 5,201,868 | A | 4/1993 | Johnson | |
| 5,210,910 | A | 5/1993 | Hellwig | |
| 5,418,031 | A * | 5/1995 | English | E04B 1/78 428/920 |
| 5,441,170 | A | 8/1995 | Bane, III | |
| 5,820,268 | A | 10/1998 | Becker et al. | |
| 6,007,467 | A | 12/1999 | Becker et al. | |
| 6,080,096 | A | 6/2000 | Becker et al. | |
| 6,182,465 | B1 | 2/2001 | Ricci | |
| 6,325,281 | B1 | 12/2001 | Grogan | |
| 6,341,708 | B1 | 1/2002 | Palley et al. | |
| 7,021,524 | B1 | 4/2006 | Becker et al. | |
| 7,140,773 | B2 | 11/2006 | Becker et al. | |
| 7,500,593 | B2 | 3/2009 | Mayer | |
| 7,624,911 | B2 | 12/2009 | Spurrell et al. | |
| 8,575,478 | B2 | 11/2013 | Hakuma et al. | |
| 8,763,811 | B2 | 7/2014 | Lantz | |
| 8,919,082 | B1 | 12/2014 | Cataldo | |
| 9,284,088 | B2 | 3/2016 | Humphries et al. | |
| 9,550,618 | B1 | 1/2017 | Jobe | |
| 9,611,067 | B2 * | 4/2017 | Collison | B65D 81/3858 |
| 9,650,198 | B2 | 5/2017 | De Lesseux et al. | |
| 9,751,683 | B1 | 9/2017 | Jobe | |
| 9,828,165 | B2 | 11/2017 | Ranade et al. | |
| 9,834,365 | B2 | 12/2017 | Pointer et al. | |
| 9,938,066 | B2 | 4/2018 | Ranade et al. | |
| 9,944,449 | B2 | 4/2018 | Wood et al. | |
| 9,981,797 | B2 * | 5/2018 | Aksan | B65D 81/3816 |
| 10,112,756 | B2 * | 10/2018 | Menzel, Jr. | B65D 65/466 |
| 10,246,236 | B2 * | 4/2019 | Menzel, Jr. | B31B 50/00 |
| 10,266,332 | B2 * | 4/2019 | Aksan | B65D 81/3862 |
| 10,273,073 | B2 | 4/2019 | Collison | |
| 10,322,843 | B2 | 6/2019 | Givens, Jr. | |
| 10,357,936 | B1 | 7/2019 | Vincent et al. | |
| D864,721 | S | 10/2019 | Menzel, Jr. et al. | |
| 10,627,153 | B2 | 4/2020 | Pompen et al. | |
| 10,807,788 | B2 | 10/2020 | Jobe | |
| 10,816,128 | B2 | 10/2020 | McGoff et al. | |
| 10,822,154 | B2 | 11/2020 | Carter | |
| D907,496 | S | 1/2021 | Menzel, Jr. et al. | |
| 10,928,115 | B2 | 2/2021 | Ansted et al. | |
| 11,078,008 | B2 | 8/2021 | Dankbaar et al. | |
| 11,254,485 | B2 | 2/2022 | Tattam | |
| 11,312,563 | B2 | 4/2022 | Smith | |
| 11,319,138 | B2 | 5/2022 | Veiseh | |
| D964,172 | S | 9/2022 | Vance | |
| 11,499,770 | B2 | 11/2022 | Rizzo et al. | |
| 11,511,927 | B2 | 11/2022 | Madanagopal et al. | |
| 11,565,871 | B2 | 1/2023 | Waltermire et al. | |
| 11,608,221 | B2 | 3/2023 | Lee et al. | |
| 11,772,872 | B2 | 10/2023 | Vance | |
| 11,897,225 | B2 | 2/2024 | Taillon et al. | |
| 11,920,861 | B2 | 3/2024 | Kieling et al. | |
| D1,057,562 | S | 1/2025 | Vance | |
| 12,195,264 | B2 | 1/2025 | Vance | |
| 12,195,265 | B1 | 1/2025 | Vance | |
| 12,421,014 | B1 | 9/2025 | Vance | |
| 12,595,110 | B1 | 4/2026 | Vance | |
| 2004/0121691 | A1 | 6/2004 | Klein | |
| 2007/0071368 | A1 | 3/2007 | Becker et al. | |
| 2010/0062921 | A1 * | 3/2010 | Veiseh | B65B 51/146 383/110 |
| 2011/0250425 | A1 * | 10/2011 | Lightman | D04H 1/425 428/221 |
| 2011/0284556 | A1 * | 11/2011 | Palmer | B65D 81/3862 53/410 |
| 2012/0145568 | A1 | 6/2012 | Collison et al. | |
| 2014/0083328 | A1 | 3/2014 | Lochel, Jr. et al. | |
| 2014/0093697 | A1 | 4/2014 | Perry et al. | |
| 2014/0120301 | A1 * | 5/2014 | Jordan | B32B 21/02 428/221 |
| 2016/0304267 | A1 * | 10/2016 | Aksan | B65D 81/3862 |
| 2016/0325915 | A1 | 11/2016 | Aksan et al. | |
| 2017/0327298 | A1 | 11/2017 | Morasse et al. | |
| 2017/0334622 | A1 | 11/2017 | Menzel, Jr. | |
| 2018/0016084 | A1 | 1/2018 | Xia et al. | |
| 2018/0050857 | A1 * | 2/2018 | Collison | B32B 5/08 |
| 2018/0134427 | A1 * | 5/2018 | Fallgren | B65D 31/08 |
| 2018/0257844 | A1 | 9/2018 | s, Jr. et al. | |
| 2018/0334308 | A1 | 11/2018 | Moore et al. | |
| 2019/0367209 | A1 | 12/2019 | Jobe | |
| 2020/0262636 | A1 | 8/2020 | Wiemann et al. | |
| 2021/0130075 | A1 | 5/2021 | Long | |
| 2021/0394993 | A1 | 12/2021 | Jacques et al. | |
| 2022/0000234 | A1 | 1/2022 | Lien | |
| 2022/0002070 | A1 | 1/2022 | Moghaddas et al. | |
| 2022/0153505 | A1 | 5/2022 | Mccarthy et al. | |
| 2022/0194683 | A1 | 6/2022 | Michel et al. | |
| 2022/0204245 | A1 | 6/2022 | Vance | |
| 2022/0388759 | A1 | 12/2022 | Patel et al. | |
| 2023/0064825 | A1 | 3/2023 | Conway et al. | |
| 2023/0105561 | A1 | 4/2023 | O'Flynn | |
| 2023/0134346 | A1 | 5/2023 | Long | |
| 2023/0322471 | A1 | 10/2023 | Madanagopal et al. | |
| 2024/0101305 | A1 | 3/2024 | Coles et al. | |
| 2024/0132271 | A1 | 4/2024 | de Lesseux | |
| 2024/0158155 | A1 | 5/2024 | Coles | |

FOREIGN PATENT DOCUMENTS

| | | | |
|---|---|---|---|
| CH | 708773 | B1 | 5/2018 |
| CN | 207903164 | U | 9/2018 |
| CN | 209684261 | U | 11/2019 |
| DE | 102021108177 | A1 | 10/2022 |
| EP | 2108598 | A1 | 10/2009 |
| EP | 3321200 | A1 | 5/2018 |
| EP | 4029807 | A2 | 7/2022 |
| EP | 4341172 | A1 | 3/2024 |
| FR | 2900136 | A1 | 10/2007 |
| GB | 958500 | A | 5/1964 |
| GB | 2451329 | A | 1/2009 |
| GB | 2551115 | B | 2/2021 |
| GB | 2592918 | A | 9/2021 |
| GB | 2602835 | A | 7/2022 |
| JP | 2003063570 | A | 3/2003 |
| JP | 5001574 | B2 | 8/2012 |

(56) References Cited

FOREIGN PATENT DOCUMENTS

| | | | |
|---|---|---|---|
| KR | 1020210156015 | A | 12/2021 |
| WO | 8807476 | A1 | 10/1988 |
| WO | 2007007139 | A1 | 1/2007 |
| WO | 2017027189 | A1 | 2/2017 |
| WO | 2017200612 | A1 | 11/2017 |
| WO | 2018069745 | A1 | 4/2018 |
| WO | 2019125511 | A1 | 6/2019 |
| WO | 2020222943 | A1 | 11/2020 |
| WO | 2022185054 | A1 | 9/2022 |
| WO | 2023281358 | A1 | 1/2023 |
| WO | 2023004449 | A1 | 2/2023 |
| WO | 2023057751 | A1 | 4/2023 |
| WO | 2023118614 | A1 | 6/2023 |
| WO | 2024062291 | A1 | 3/2024 |
| WO | 2024062292 | A1 | 3/2024 |
| WO | 2024062343 | A1 | 3/2024 |

OTHER PUBLICATIONS https://pelibiothermal .com/golden hour; taken Jun. 20, 2019 Peli Bio Thermal article stating that mobile blood products containers have been desired since at least 2003. (Year: 2019).

* cited by examiner 10
20

50

A
10
A

INSULATED CONTAINER

CROSS REFERENCE TO RELATED APPLICATIONS

This application is a continuation of U.S. patent application Ser. No. 18/667,637, filed May 17, 2024, which is a continuation of U.S. patent application Ser. No. 15/977,520, filed May 11, 2018, now abandoned, which is a continuation of International Patent Application No. PCT/US2018/032101, filed May 10, 2018, which is a nonprovisional of and claims priority to U.S. Provisional Application No. 62/609,102, filed Dec. 21, 2017; and U.S. patent application Ser. No. 15/977,520 is also a continuation-in-part of U.S. patent application Ser. No. 15/959,801, filed Apr. 23, 2018, and issued as U.S. Pat. No. 10,246,236 on Apr. 2, 2019, which is a divisional of U.S. patent application Ser. No. 15/436,417, filed Feb. 17, 2017, and issued as U.S. Pat. No. 10,112,756 on Oct. 30, 2018, which is a nonprovisional of and claims priority to U.S. Provisional Application No. 62/338,136, filed May 18, 2016; and U.S. patent application Ser. No. 15/977,520 is also a continuation-in-part of International Application No. PCT/US2017/018461, filed Feb. 17, 2017, which is a nonprovisional of and claims priority to U.S. Provisional Application No. 62/338,136, filed May 18, 2016; and U.S. patent application Ser. No. 15/977,520 is also a continuation-in-part of U.S. Design patent application Ser. No. 35/001,475, filed as International Design Registration DM/0099523 on Dec. 22, 2017, and issued as U.S. Design Pat. No. D864,721 on Oct. 29, 2019; and the present application claims priority to and the benefit of all of such prior applications, which are all incorporated by reference herein in their entireties.

TECHNICAL FIELD AND BACKGROUND OF THE INVENTION

The present invention relates to the field of containers and to the field of insulated containers. More particularly, the present invention relates to the field of insulated shipping containers utilizing sustainable materials including recycled post-industrial, pre-consumer natural fiber. The containers according to the present invention may be used in transporting and storing objects which may be at a temperature that is different from the temperature outside the container.

Temperature sensitive products need to be transported from time to time. For instance, certain medications may need to be kept cool relative to temperatures outside of the container. In other instances, food may need to be kept warm relative to temperatures outside of the container. As a result of these needs, packaging has been designed to maintain an internal temperature according the requirements of the product. Some packaging may utilize electro-mechanical devices such as refrigeration, heat exchangers, or heat sinks in order to provide a required steady temperature. Other packaging may utilize foams, plastics, and other polymers along with cool packs, water ice, or dry ice in order to maintain the required temperature environment inside the packaging.

However, many of these packages and devices are expensive and heavy (as with the refrigeration and heat sinks) or are harmful to the environment (as with some refrigeration and also the foams and plastics) or both. Because of these problems, some have devised products which may be made from post-consumer waste such as recycled cotton gathered from used clothing. However, these products may be prone to contamination from yarn dies, applied chemicals, and other contaminants which the clothing may have acquired during the period of use. The post-consumer material must be cleaned and shredded ahead of reprocessing, however, this process does not eliminate yarn dies and the possibility of contaminants. Most post-consumer waste retains a blue colorization after processing. Therefore, because of the contamination and residual colorization issues these products require that any insulation manufactured from post-consumer cotton be wrapped in another material such as plastic. This use of plastic and other barriers undermines the environmental incentive for using a recycled product by posing additional environmental concerns. It may also further add to the manufacturing costs.

Accordingly, there is a long felt need in the art for a packaging material which affords safe transportation of temperature sensitive materials, which has a consistent density, which maintains an in internal temperature relative an external temperature, which is efficiently and economically manufactured, which is lightweight, and which minimizes negative impacts to the environment.

BRIEF SUMMARY OF THE INVENTION

The present invention is an insulated shipping container which affords safe transportation of temperature sensitive products, which has a consistent density, which maintains an in internal temperature relative to an external temperature, which is efficiently and economically manufactured, which is lightweight, and which minimizes negative impacts to the environment.

The present invention utilizes post-industrial, pre-consumer cotton waste. Post-industrial, pre-consumer cotton waste may include fiber material gleaned and/or trimmed as part of cotton manufacturing, and converting process.

Such fiber material, collected from the manufacturing process, may contain small pieces of cotton seed pods and stems removed as part of the manufacturing process. These fiber materials have not been converted into finished products (such as clothing or other fabrics). Thus, the present invention is directed to an insulated shipping container utilizing unwrapped cotton waste as the thermal insulating layer.

However, the invention is not limited only to waste generated from a single manufacturing or converting process. As such, post-industrial, pre-consumer waste may be from raw cotton processing, cotton yarn manufacturing, cotton fabric manufacturing and related processes such as carding, airlay, garneting, and other similar methods of manufacturing.

According to one aspect of the invention, the use of polyethylene film wrapped around pads manufactured from cotton waste can be eliminated. No wrapping is required by the present invention and exposed fibers alone can be utilized. Because the fibers are pre-consumer, according to the present invention, the risk of cross contamination from post-consumer recycled products is eliminated.

Alternatively, a natural fiber lamination may be applied to surfaces in order to provide a smoother surface wherein images and indicia may be applied. The elimination of poly wrap may provide an environmental benefit and also be a cost saving measure. The entirety of the insulation layer, whether including fibers alone or also including the laminated layer is biodegradable in anaerobic environments.

According to one embodiment of the invention, the insulating layer may have applied to it one or more natural fiber lamination layers. The natural fiber lamination layer may be applied to an outer surface of the insulating layer which may be a contact surface. In some embodiments, the natural fiber lamination layer may be applied to only one surface or may be applied to two surfaces but need not be applied to side edge surfaces.

According to one embodiment of the invention, an insulated container may include a rigid container surrounding an insulation layer formed from a post-industrial cotton waste. The insulation layer may be characterized by a lack of any wrapping material.

According to another embodiment of the invention, the rigid container may be made from cardboard.

According to another embodiment of the invention, the rigid container may be made from plastic. The plastic may be a reusable plastic.

According to another embodiment of the invention, the insulation layer may include a pair of interlocking C-shaped members forming an enclosed cube shaped cavity. The interior of the cube may form an interior portion of the insulated container.

According to another embodiment of the invention, the interlocking C-shaped members, referred to as an "A" and a "B" pad, may have a top portion which is integrally and hingedly formed in the member for providing access to an interior portion of the insulated container.

According to a method of practicing the invention, an insulated container may be manufactured by providing a rigid container and providing a quantity of post-industrial cotton waste. This post-industrial cotton waste may then be processed into a fiber sheet. The sheet made from the waste may be formed using a variety of converting processes including, carding, airlay, and needle punch to achieve a specified thickness and density. Next, the sheet may be cut into rectangular sections. A pair of sections may be arranged to form interlocking C-shaped members. The pair of sections, referred to as an "A" pad and a "B" pad, may then be placed into the rigid container.

According to another aspect of the method, the method may further include the step of laminating a natural fiber lamination layer to the fiber sheet.

According to another aspect of the method, the cotton waste includes cotton waste generated from one or more of cotton processing, cotton manufacturing, and/or cotton converting.

According to another aspect of the method, the insulation layer is capable of maintaining a constant internal temperature for 48 hours where three 500 ML and two 250 ML IV bags are cooled by four 24 oz frozen ice packs placed at the top and bottom below a payload.

According to another aspect of the method, the insulation layer is biodegradable in an anaerobic environment.

According to another aspect of the invention, both the rigid container and the pair of sections of the insulation layer may be provided to an end user in sheet form and may be assembled into the insulated container by the end user.

According to another embodiment of the invention, the insulated container may include an insulation layer formed from a post-industrial, pre-consumer cotton waste, a rigid cardboard container surrounding the insulation layer, and a natural fiber lamination layer applied to a contact surface of the insulation layer. According to such an embodiment, the cotton waste may include cotton waste generated from one or more of cotton processing, cotton manufacturing, and/or cotton converting. According to such an embodiment, the insulation layer may be biodegradable in an anaerobic environment. According to such an embodiment, the insulation layer may be capable of maintaining a constant internal temperature for 48 hours where three 500 ML and two 250 ML IV bags are cooled by four 24 oz frozen ice packs placed at the top and bottom below a payload.

According to one embodiment, the term biodegradable may mean that the insulation layer will biodegrade completely within one year or less when subjected to the biodegration dynamics contained in ASTM D5511. According to the ASTM D511 protocol, test reaction mixture consisted of 10% shredded nitrile gloves, 10% Trypticase Soy Broth, 10% Thioglycollate medium, 60% municipal solid waste, and inoculated with concentrated inoculum ($1.2\times10^6$ CFU/ml) of aerobic and anaerobic mixed culture in 0.01 M phosphate buffer at pH 7.2 placed in aerobic and anaerobic glass digesters, and incubated at 37.5°. Positive controls consisted of reaction mixture above with lab-grade cellulose (100%, Aldrich) instead of shredded test sample(s) while negative controls contained EDTA lab-grade (100%, Aldrich) instead of shredded test sample(s) in the test above. Reaction mixture was monitored at least daily, often more frequently, and sampled weekly for CO2 production, trapped in 3 KOH bottles connected in series, over a period of 15 weeks when cumulative CO2 production was observed. Biodegradation was deemed to be positive (passed P test, 95 or >95% biodegradation) or negative (failed test, 5 or <5% biodegradation), based on carbon conversion. Percentages (%), actual observed versus theoretical possible-based on total carbon content-were determined on a dry weight basis.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

Figure 1:
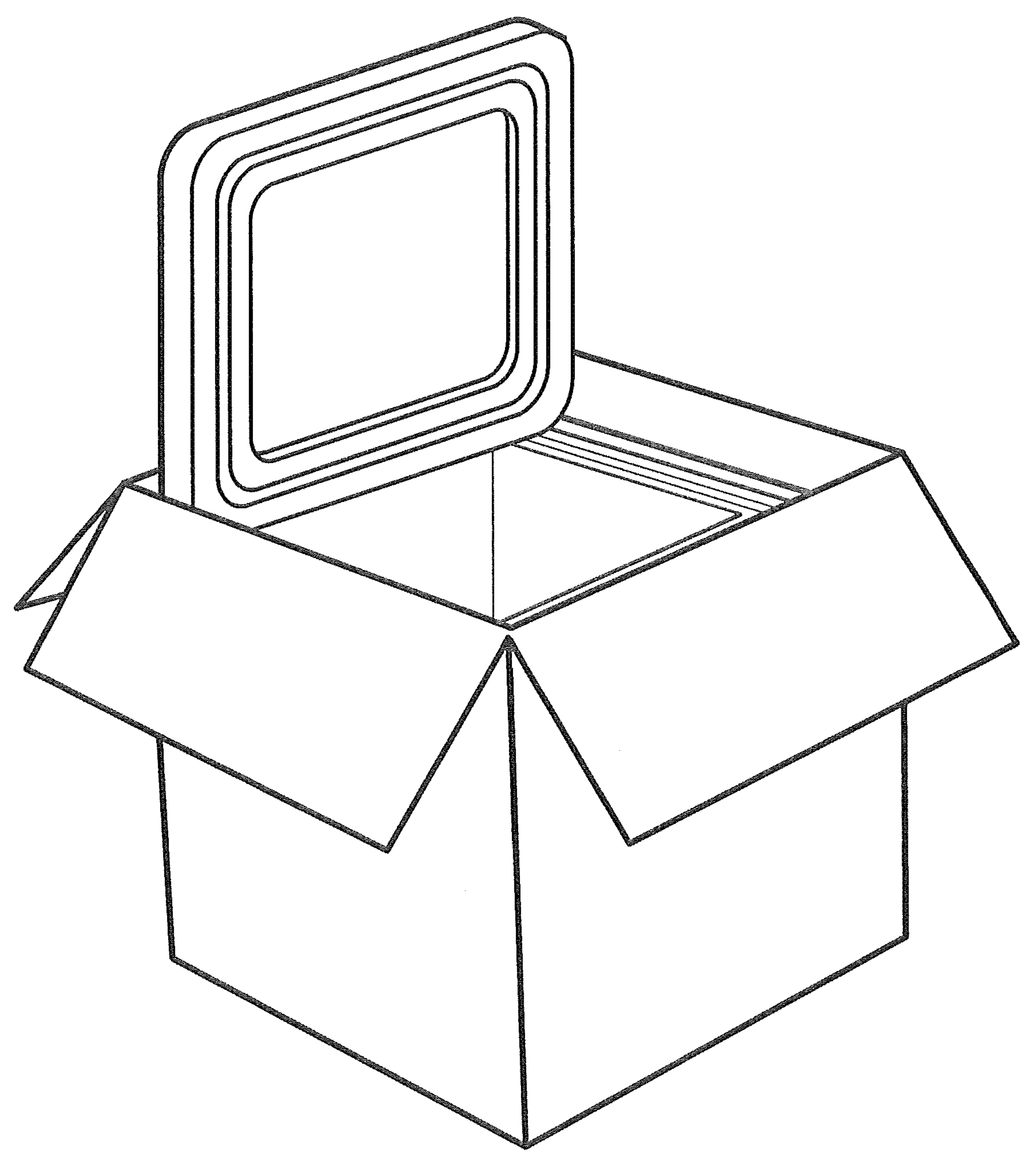
FIG. 1 is a perspective view of a prior art insulated container where the insulating material is expanded polystyrene foam.
Figure 2:
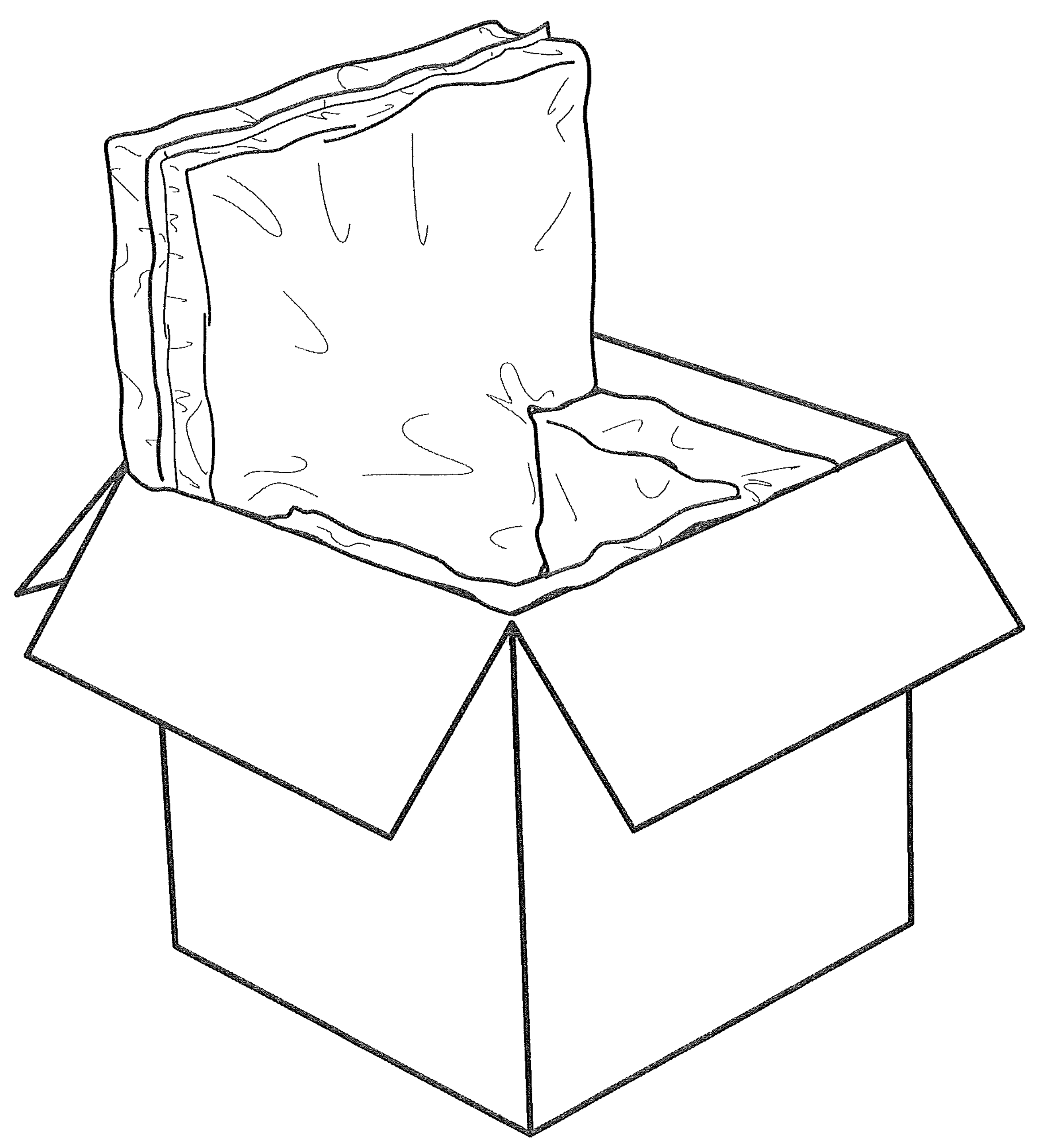
FIG. 2 is a perspective view of a prior art insulated container where the insulating material is enclosed in plastic.

FIG. 1 and FIG. 2 show prior art insulated containers. In particular, FIG. 1 shows a prior art insulated container having a rigid foam insulation layer. FIG. 2 shows a prior art insulated container having an insulation layer which is wrapped in plastic.

Figure 13:
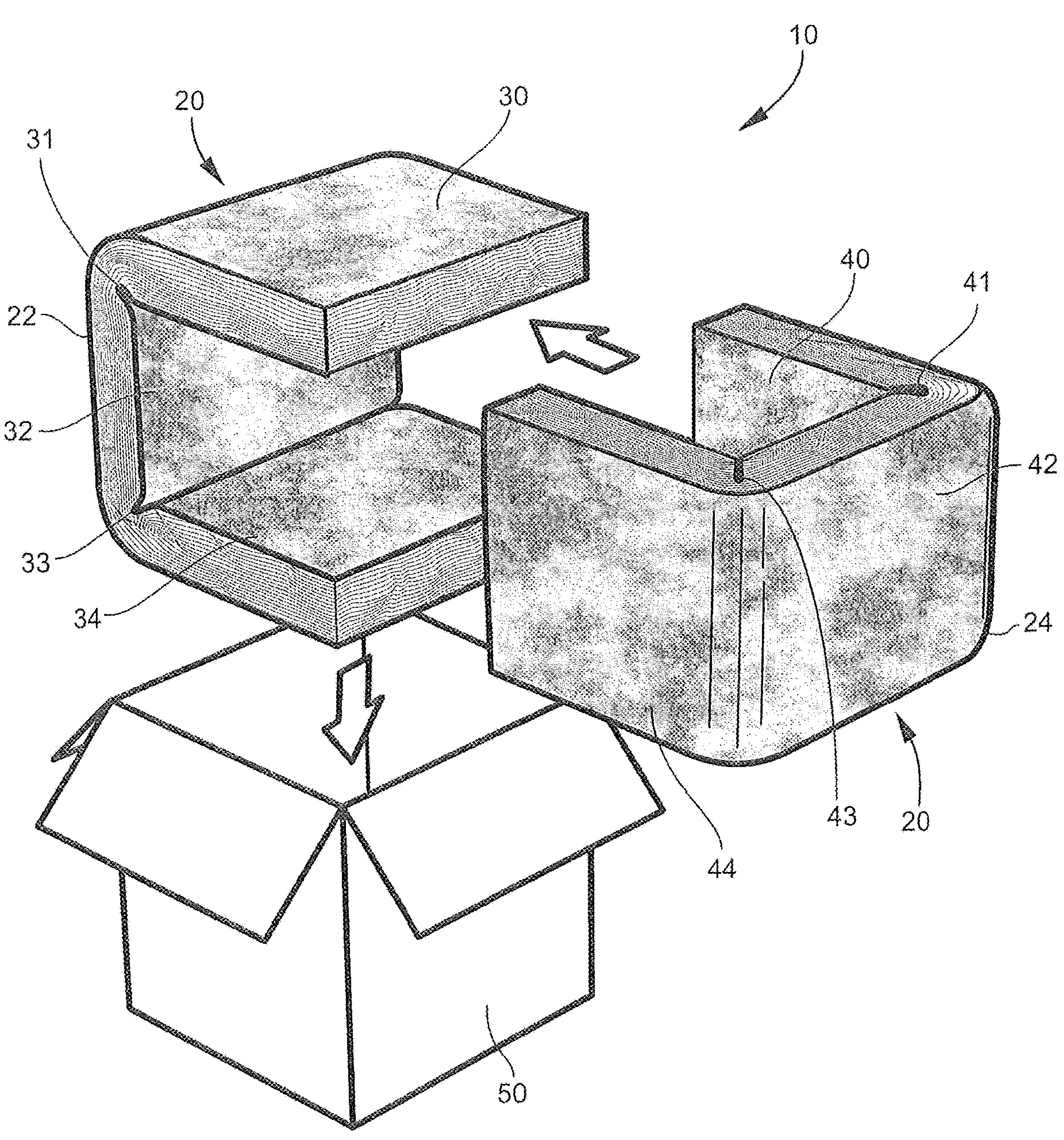
FIG. 13 is an exploded view of the insulated container in a partially assembled state and where the insulation layer does not include the natural fiber lamination.

Generally, FIGS. 3 through 10, show embodiments of the invention with insulation layer 20 having a natural fiber lamination layer 26 applied to contact surfaces. The contact surfaces are surfaces which may come into contact with contents of the container. Generally, FIG. 13 shows an alternate embodiment of the invention where there is no natural fiber lamination layer and the fibers of the insulation layer 20 are exposed to the contents of the container. The embodiment utilizing the natural lamination layer 26 may be preferred to the embodiment of FIG. 13 when a shipper desires that the contents not come into contact with the insulation layer, such as when shipping raw, unwrapped produce. The natural fiber lamination layer 26 is sustainable and is biodegradable. The natural fiber lamination layer 26 thus provides a helpful option to companies seeking a smoother, more consistent surface. The natural fiber lamination layer 26 may be made from a coffee filter paper, kraft paper, and the like. Text and images (not shown) may be printed on the lamination layer 26.

Figure 3:
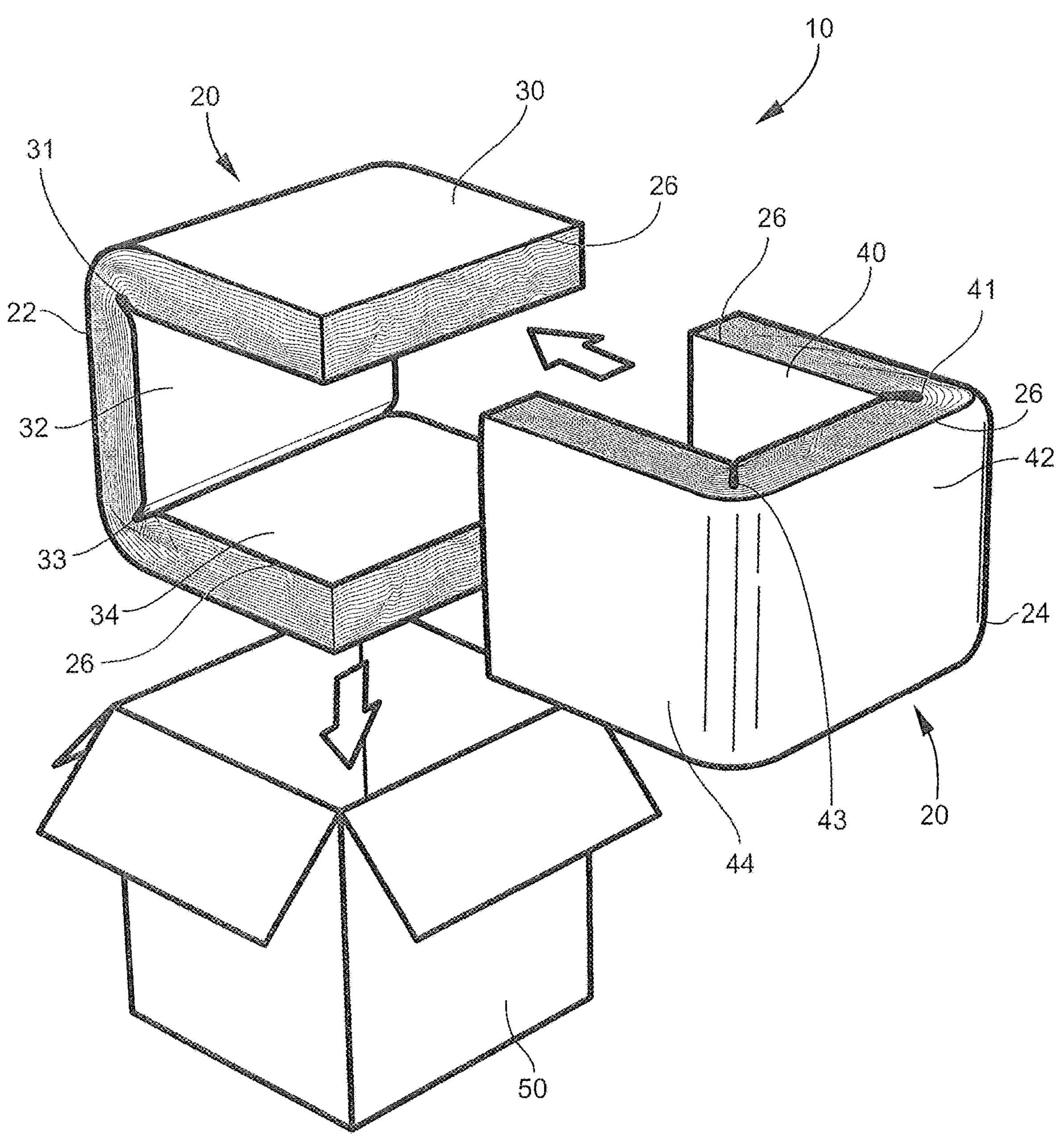
FIG. 3 is an exploded view of the insulated container in a partially assembled state.

Referring to FIG. 3, an insulated container 10 is shown in a partially assembled state. The insulated container 10 includes rigid container 50 and insulation layer 20. The rigid container 50 may be a cardboard box as shown. The insulation layer 20 is made from cotton waste. The cotton waste is processed into a sheet formed using a variety of converting processes including, carding, airlay, and needle punch to form a non-woven sheet. The insulation layer 20 is formed to maintain uniform density and of a thickness optimized for particular applications.

The sheet may then be cut into rectangles which may be bent into a pair of C-shaped members, 22, 24. The first C-shaped member, referred to as an "A" pad 22 forms lid portion 30 which is connected to back side portion 32 via first hinge portion 31. Bottom portion 34 is connected to back portion 32 via second hinge portion 33.

Similarly, the second C-shaped member, referred to as a "B" pad 24 forms first side portion 40 which is connected to front side portion 24 via hinge 41. Second side portion 44 is connected to front side portion 24 via hinge portion 43.

Figure 4:
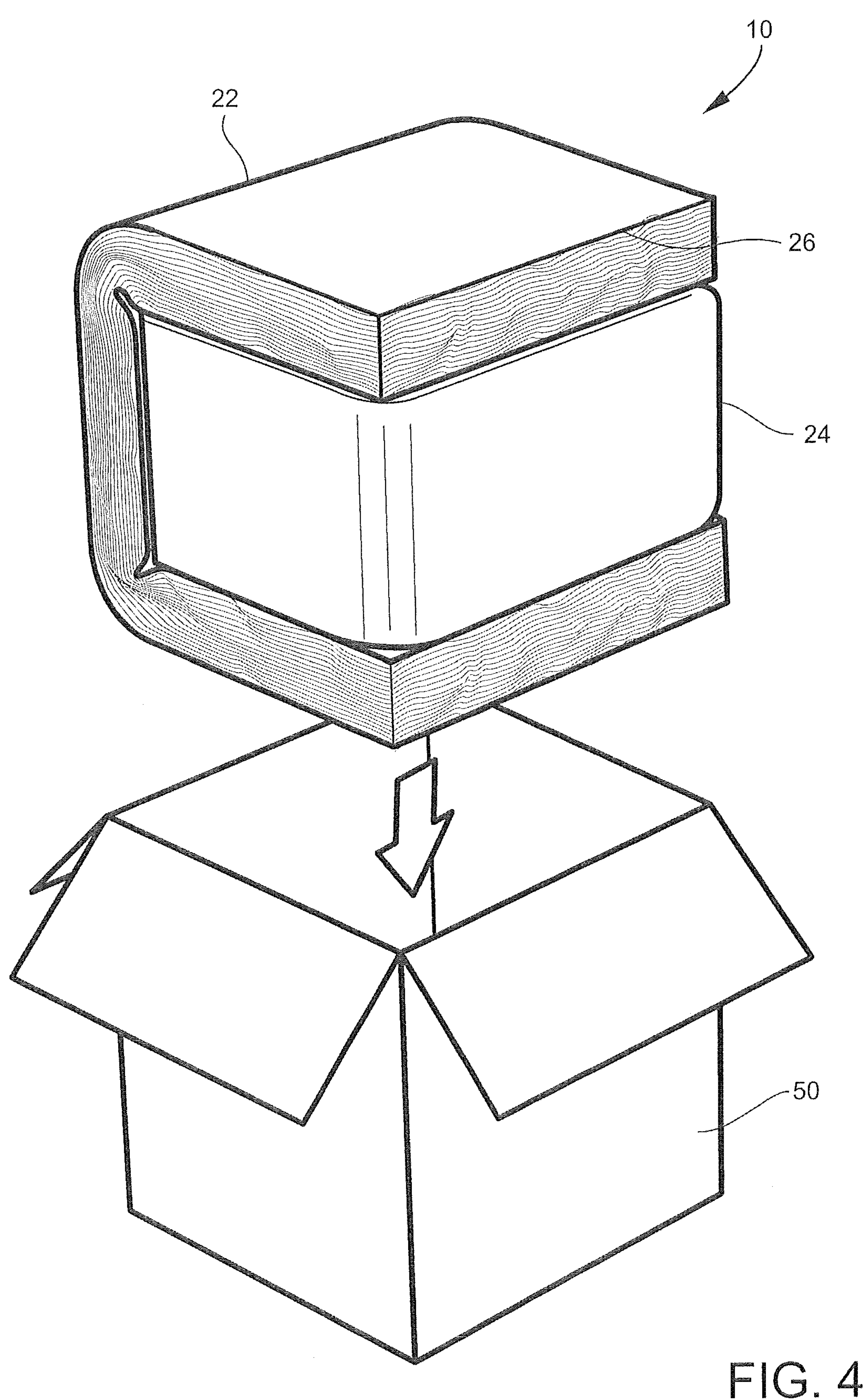
FIG. 4 is an exploded view of the insulated container in a partially assembled state.

When assembled, as shown in FIG. 4, second C-shaped member 24 fits into a cavity formed by first C-shaped member 22 to form the interlocking C-shapes of the insulation layer 20.

Figure 5:
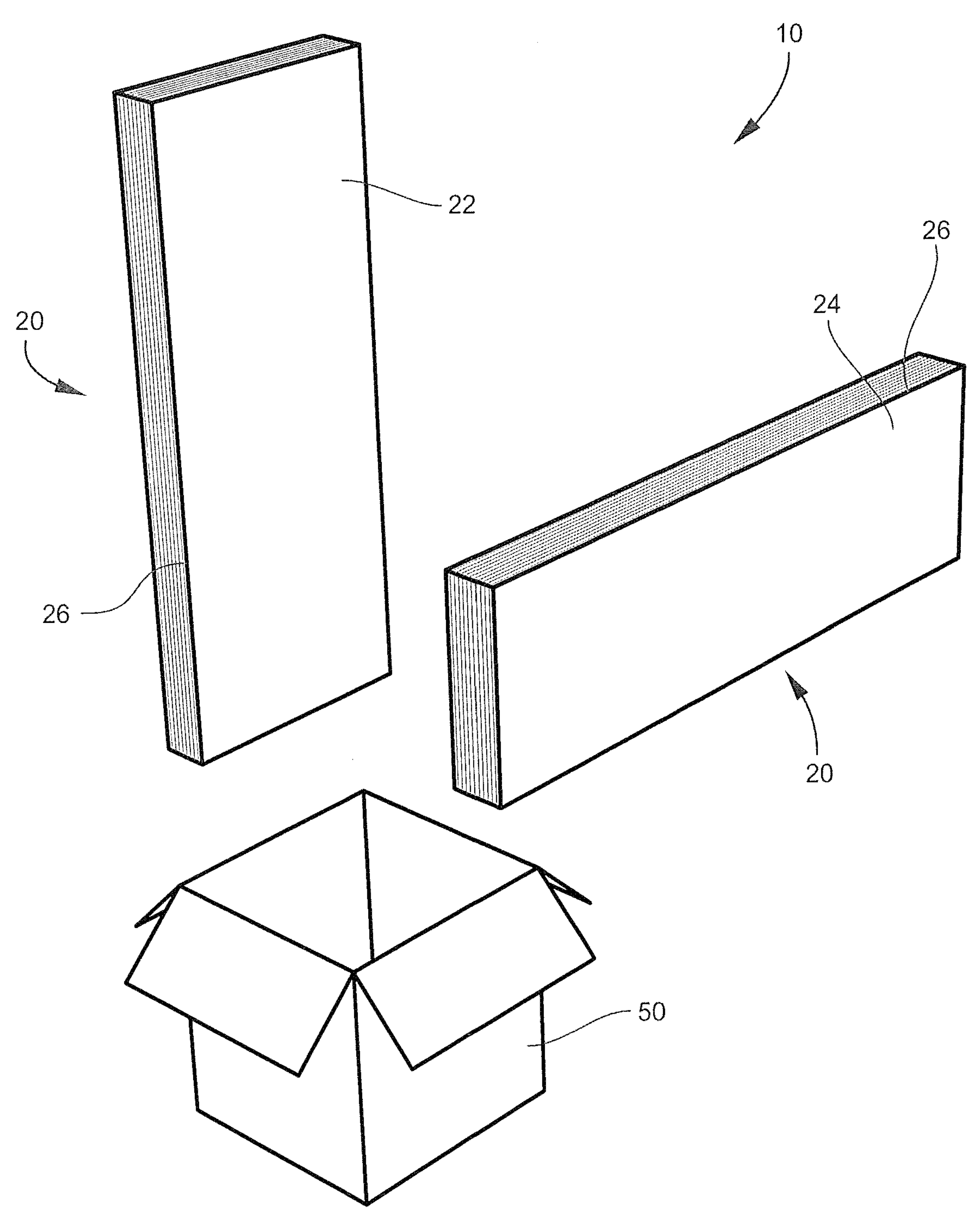
FIG. 5 is an exploded view of the insulated container in an unassembled state.
Figure 6:
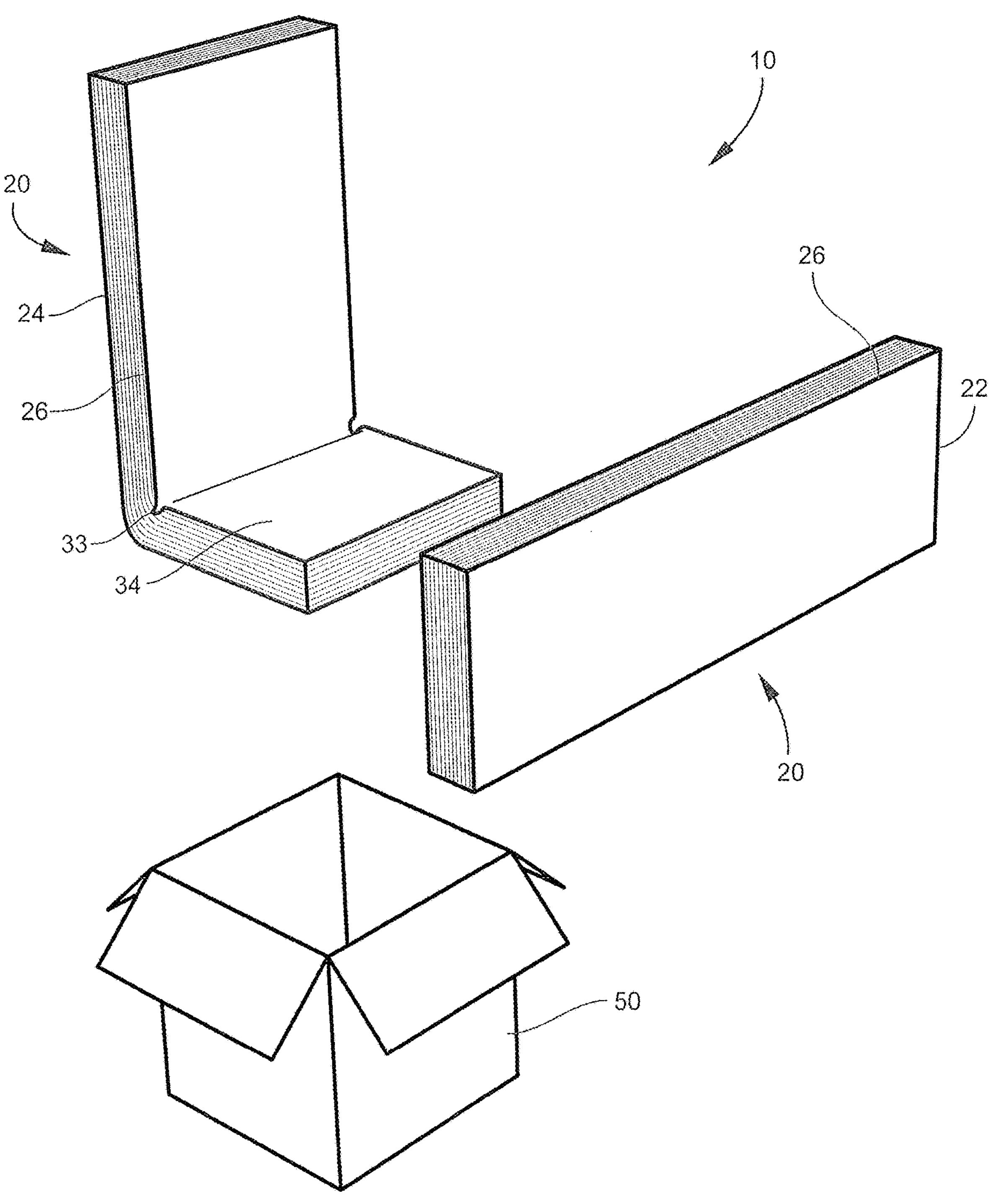
FIG. 6 is an exploded view of the insulated container in a partially assembled state.
Figure 7:
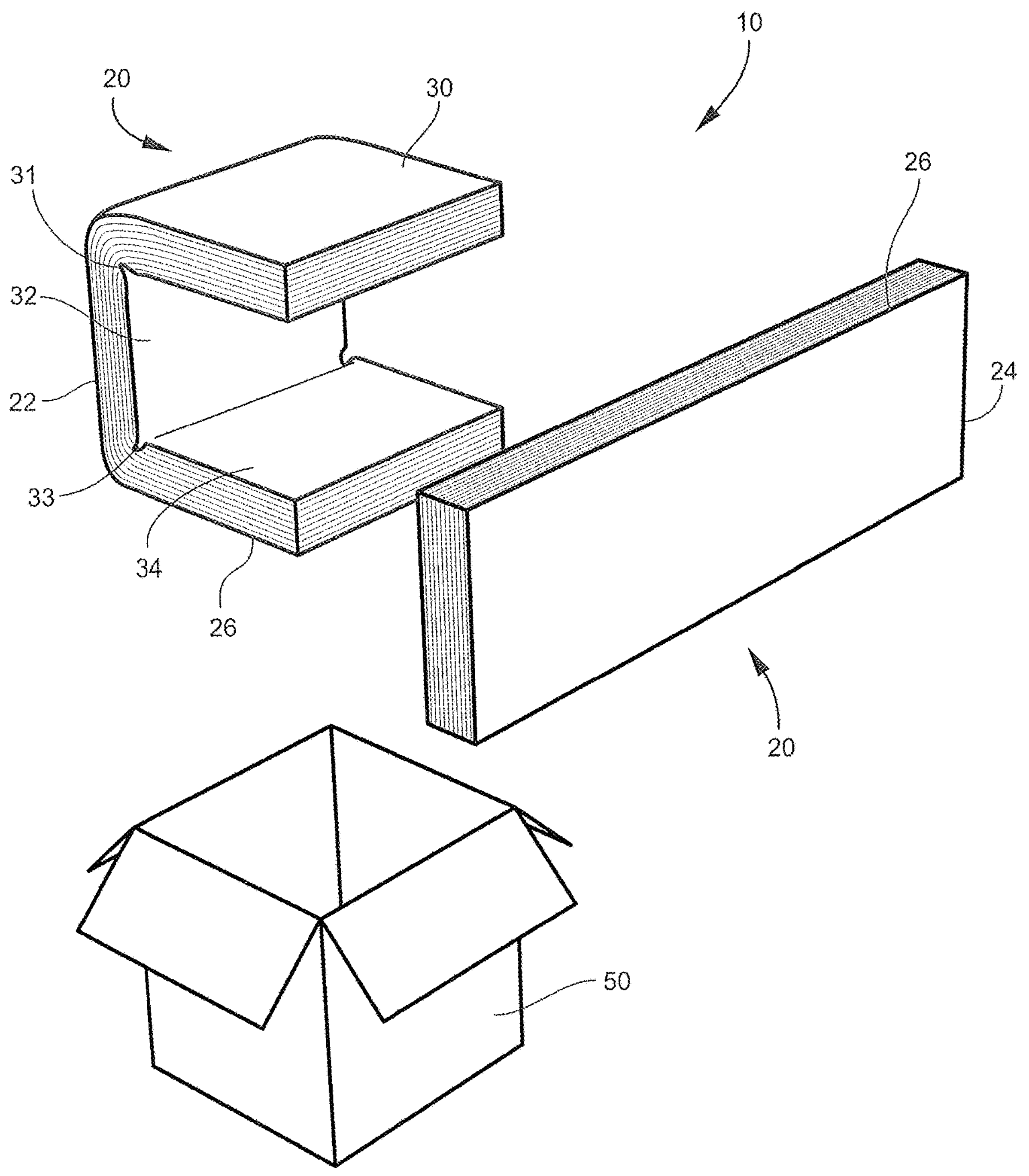
FIG. 7 is an exploded view of the insulated container in a partially assembled state.
Figure 8:
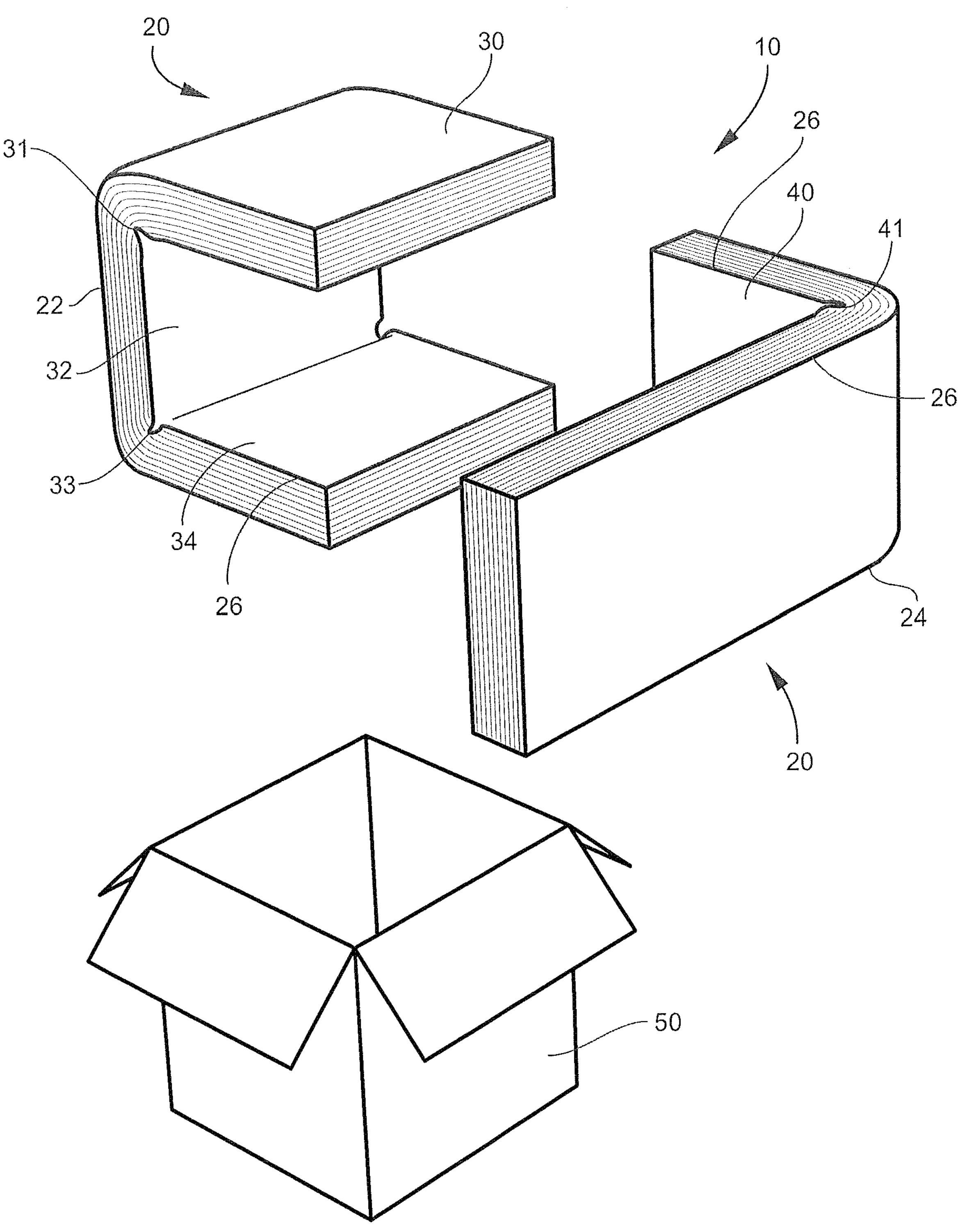
FIG. 8 is an exploded view of the insulated container in a partially assembled state.
Figure 9:
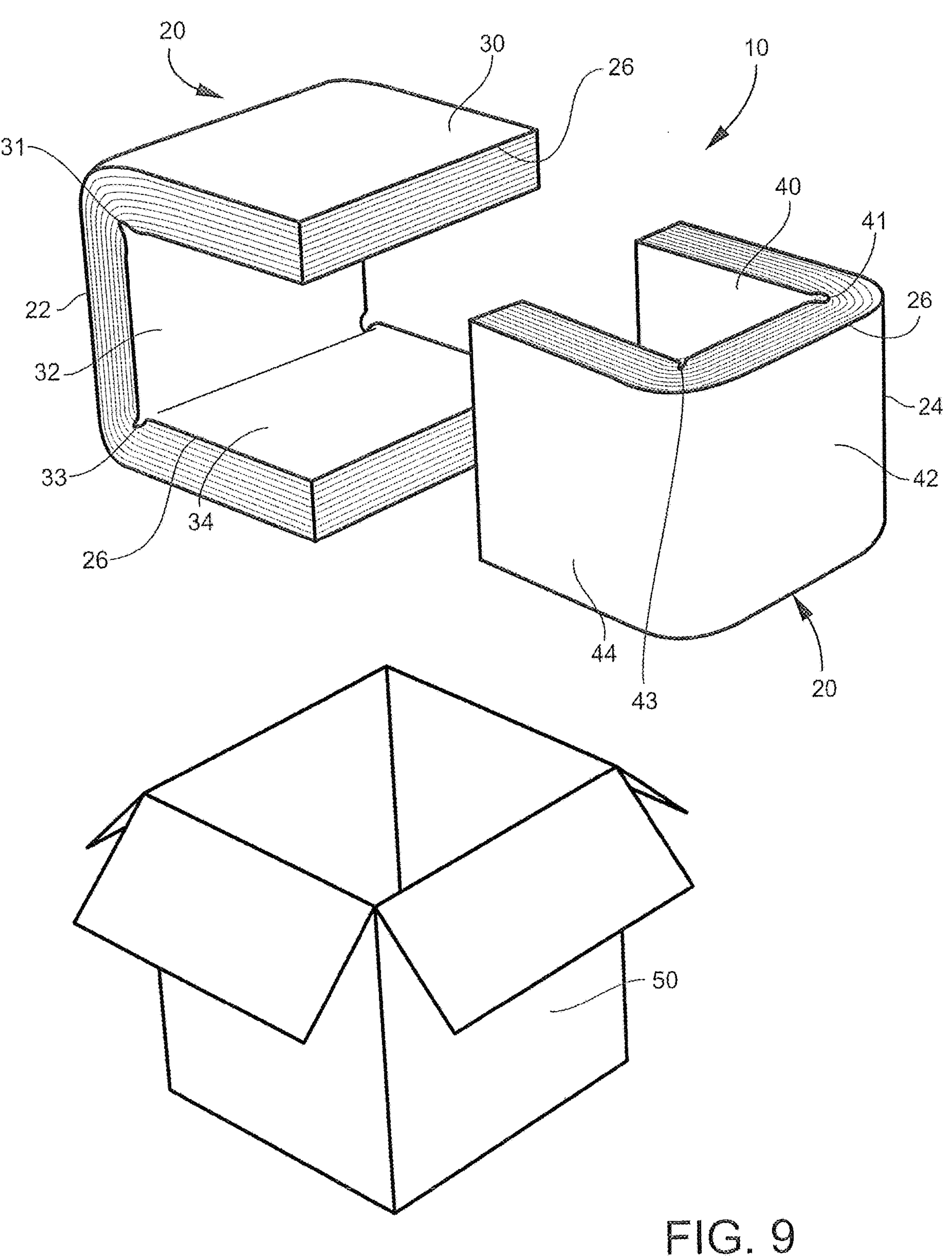
FIG. 9 is an exploded view of the insulated container in a partially assembled state.
Figure 10:
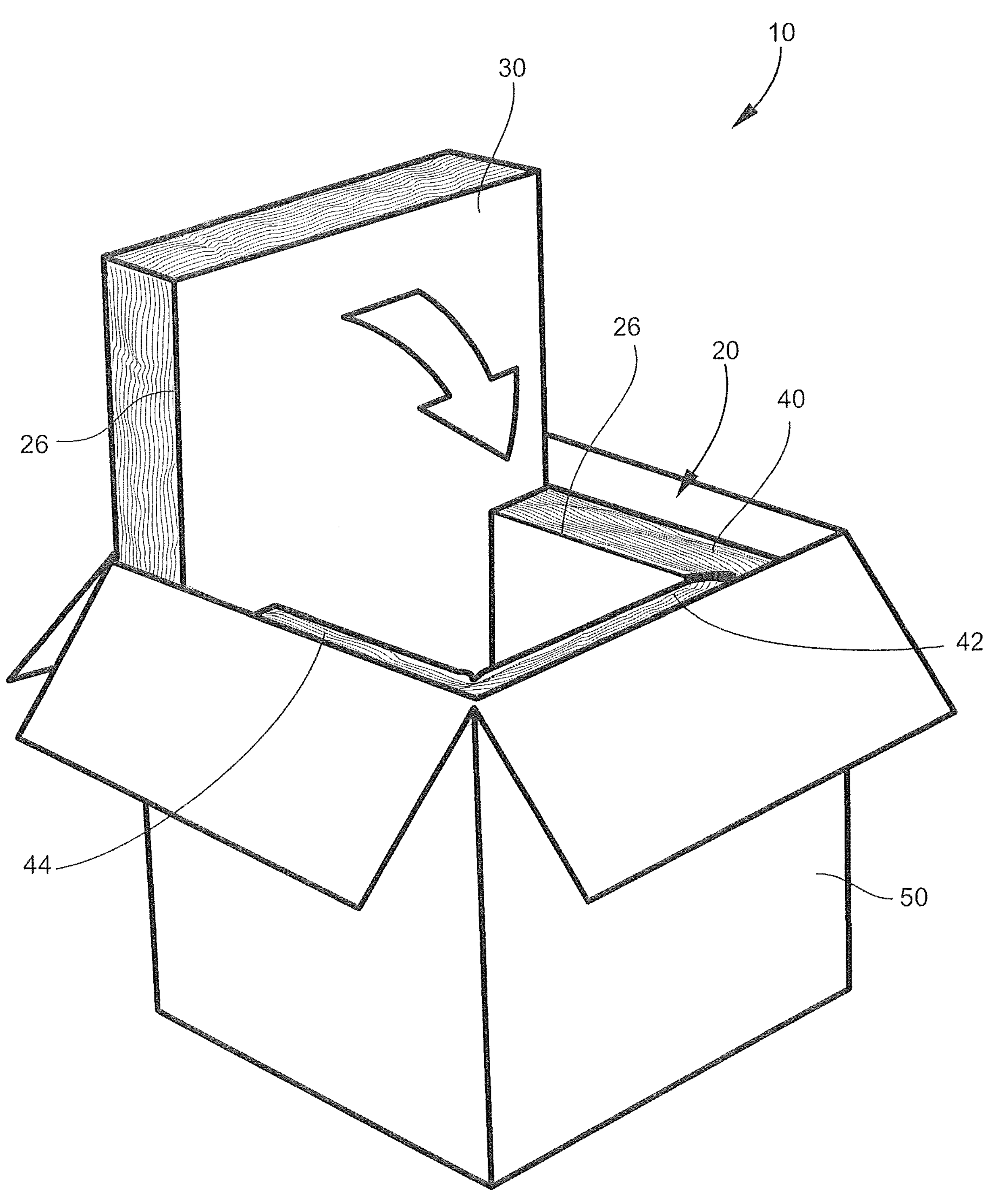
FIG. 10 is an exploded view of the insulated container in a partially assembled state.

As shown in FIGS. 5-10, the insulation layer 20 of the insulated container 10 may be assembled by folding respective C-shaped members 22, 24. As shown in FIG. 5, the C-shaped members 22, 24 may have in unfolded state that is a flat rectangular shape. As shown in FIGS. 6-9, hinges 31, 33 and 41, 43 may be formed by folding. These folds separate the portions 30, 32, 34, 40, 42, 44 of each C-shaped member 22, 24.

Figures 11, 12:
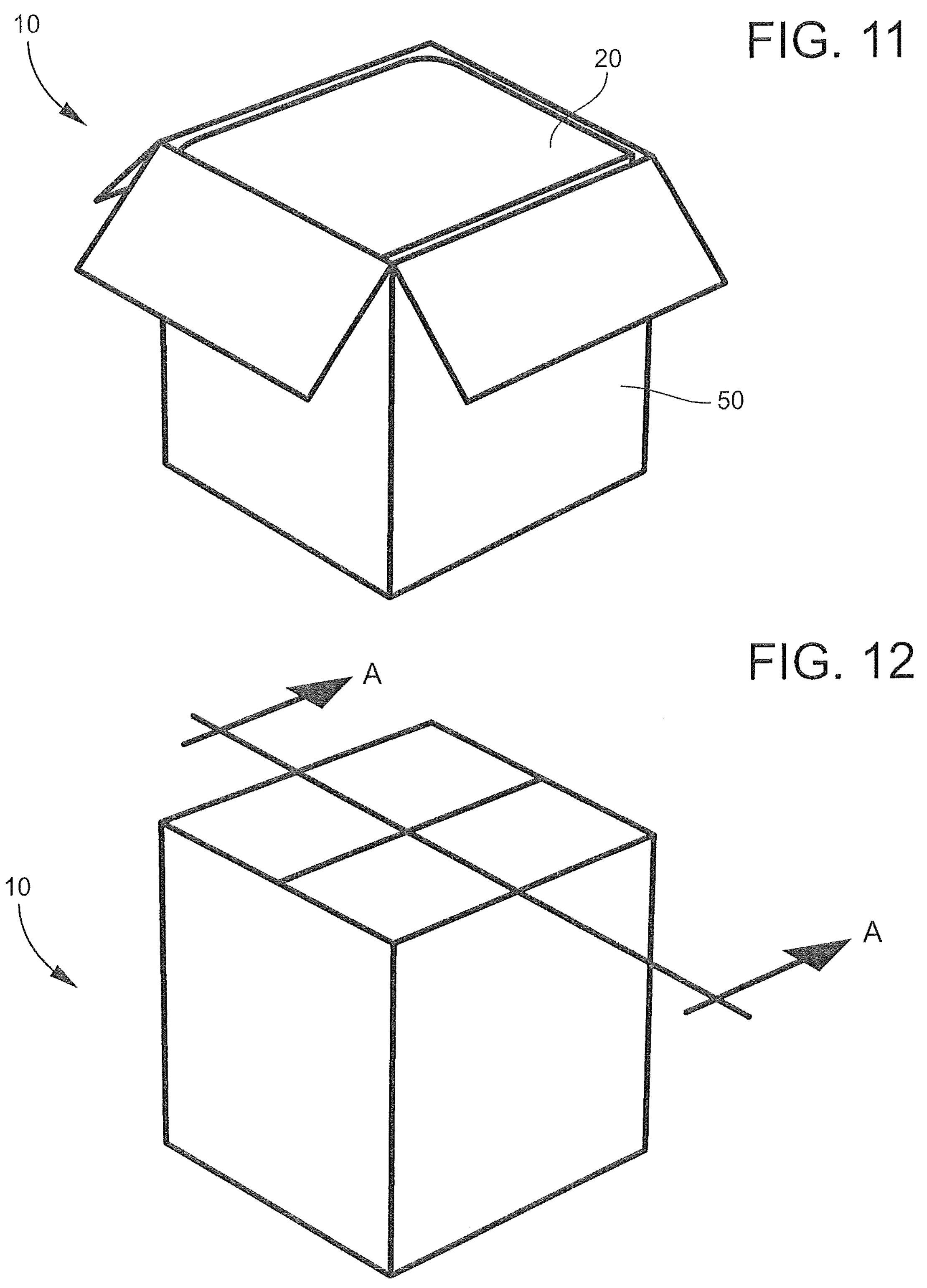
FIG. 11 is a perspective view of the insulated container in an assembled state.
FIG. 12 is a perspective view of the insulated container in an assembled state.
Figure 12A:
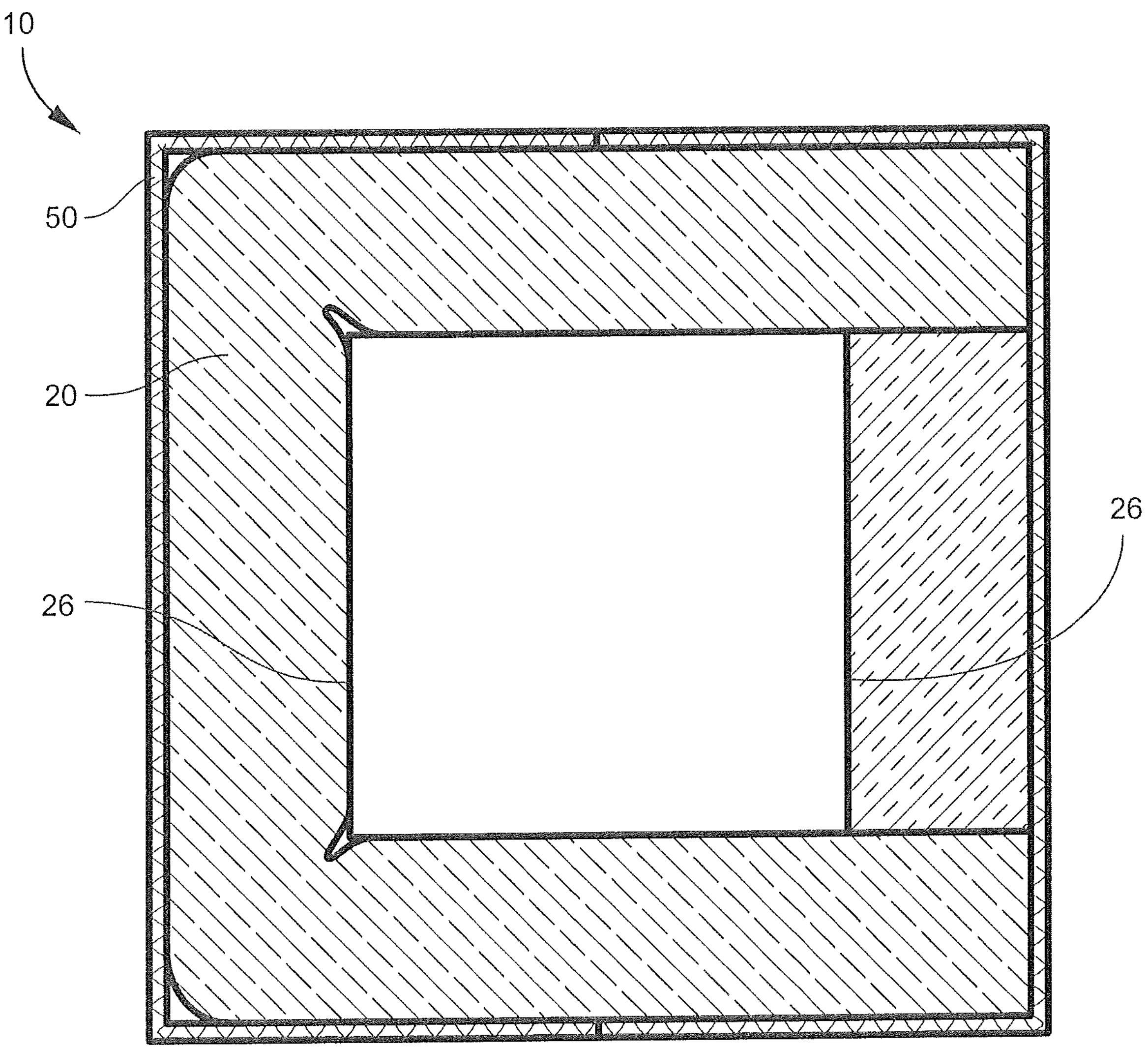
FIG. 12A is sectional view of the insulated container.

FIG. 11 shows the fully assembled insulated container 10 with the lid of the rigid container 50 open. FIG. 12 visualized the cross-section A-A which is shown in FIG. 12A. In particular, the cross section A-A shows the insulation layer 20 inside the rigid container 50. The natural fiber lamentation layer 26 is shown on the contact surfaces. Importantly, there is no plastic or non-biodegradable layer between the insulation layer 20 and the rigid container 50 as is present in the prior art of FIG. 2. That is, there is no additional plastic housing surrounding the insulation layer 20. Both to the rigid container 50 and the internal cavity of the insulate container.

FIG. 13 shows the insulated container 10 of FIGS. 3-12A but where the natural fiber insulation layer has not been added during the manufacturing process. Accordingly, the cotton waste of the insulation layer 20 is exposed.

Figure 14:
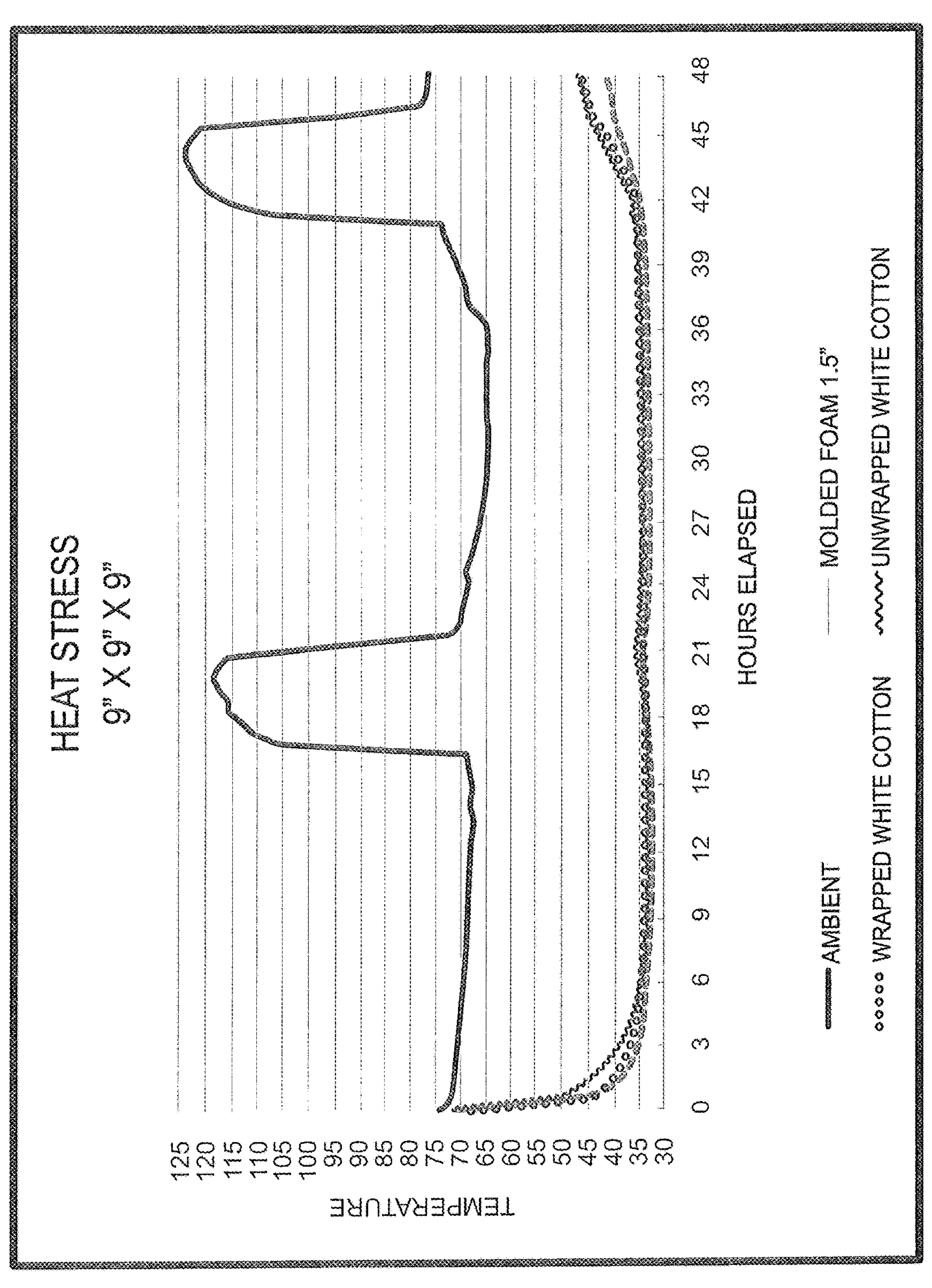
FIG. 14 is a heat stress chart.

An embodiment of the invention may be created wherein the container is capable of maintaining a constant internal temperature for 48 hours where three 500 ML and two 250 ML IV bags are cooled by four 24 oz frozen ice packs. The ice packs are placed at the top and bottom below the payload. FIG. 14 shows heat stress test results which were recorded by individual data loggers within and outside the test package as well as in proximity to the IV bags. The top line shows the ambient temperature outside the insulated container. The other lines show "wrapped white cotton" "molded 1.5 inch foam" and "unwrapped white cotton."

Figure 15:
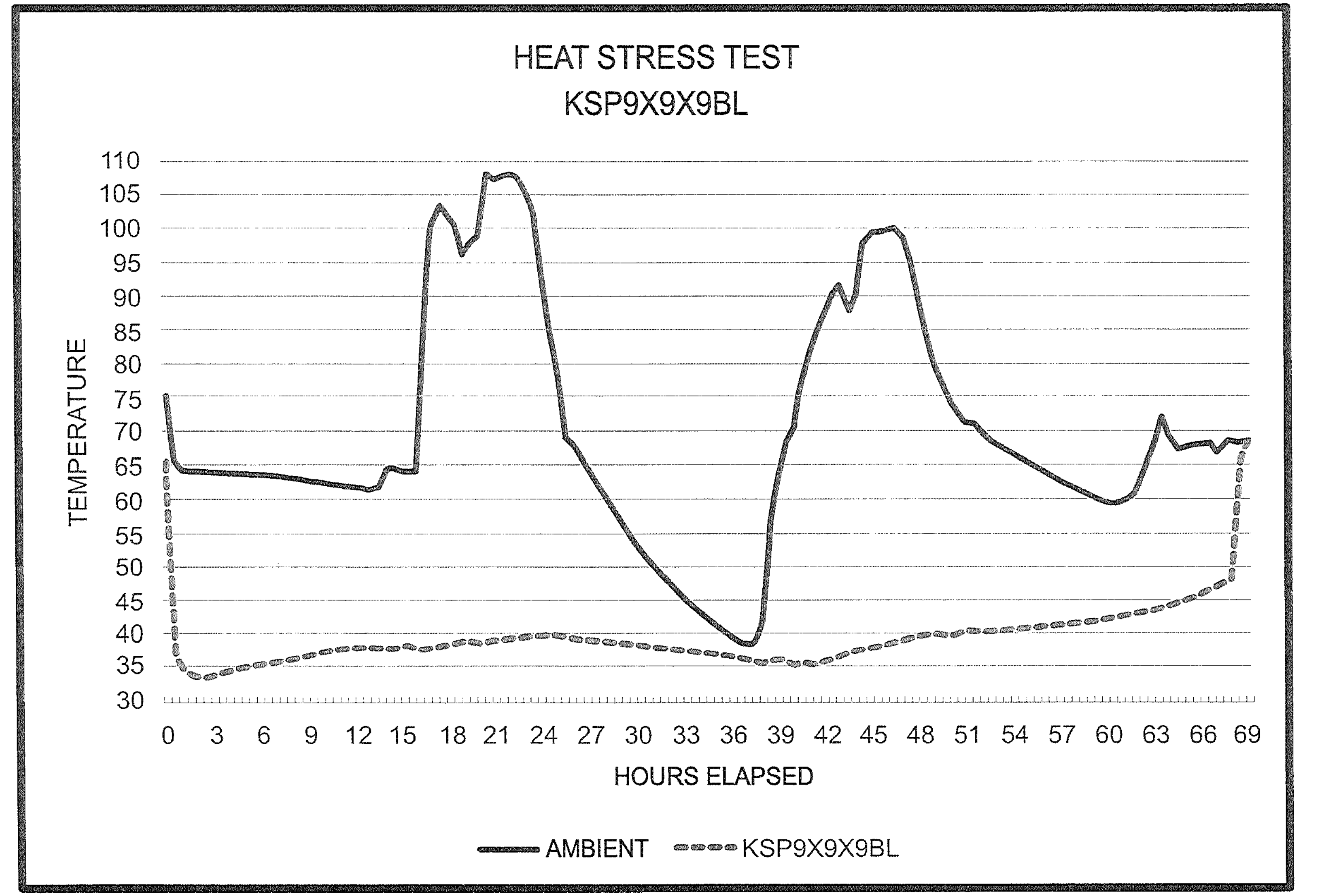
FIG. 15 is a heat stress chart.

Another embodiment of the invention may be created wherein the container is capable of maintaining a constant internal temperature for 48 hours where six 600 ML IV bags are cooled by four 24 oz frozen ice packs. The ice packs are placed at the top and bottom below the payload. FIG. 15 shows heat stress test results which were recorded by individual data loggers within and outside the test package as well as in proximity to the IV gabs. The top line shows the ambient temperature outside the insulated container. The lower line shows the internal temperature.

Figure 16:
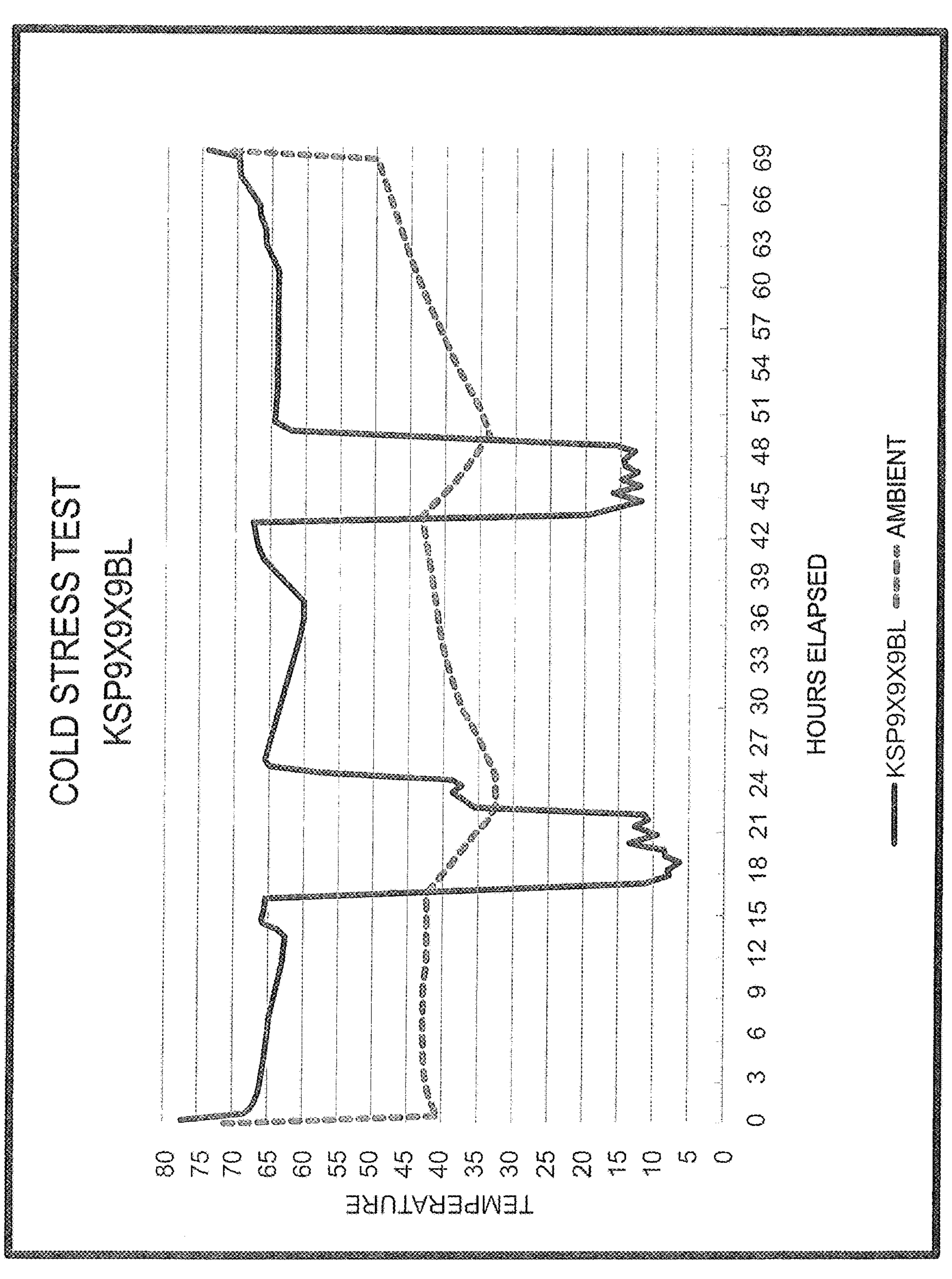
FIG. 16 is a cold stress chart.

Another embodiment of the invention may be created wherein the container is capable of maintaining a constant internal temperature for 48 hours where six 600 ML IV bags are cooled by two 24 oz frozen ice packs and two 24 oz ambient ice packs. The ice packs are placed at the top and bottom below the payload. FIG. 16 shows cold stress test results which were recorded by individual data loggers within and outside the test package as well as in proximity to the IV gabs. The top line shows the ambient temperature outside the insulated container. The lower line shows the internal temperature.

Another embodiment may be created where the insulated container 10 complies with test scope protocol ISTA 7D such that it maintains temperature above 2° C. and below 8° C., without freezing, in simulated summer/heat stress conditions for a 48 hour distribution cycle. According to the ISTA 7D test, six 24 oz gel ice packs were added to the insulated container 10 with a payload of six 500 mL IV bags (Lactated Ringer's Solution USP), conditioned to 3° C.

Another embodiment may be created where the insulated container 10 complies with test scope protocol ISTA 7D such that it maintains temperature above 2° C. and below 8° C., without freezing, in simulated winter/cold stress conditions for a 48 hour distribution cycle. According to the ISTA 7D test, four 24 oz gel ice packs were added to the insulated container 10 with a payload of ten 500 mL IV bags (Lactated Ringer's Solution USP), condition to 3° C.

An insulated container 10 according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims. It is envisioned that other embodiments may perform similar functions and/or achieve similar results. Any and all such equivalent embodiments and examples are within the scope of the present invention and are intended to be covered by the appended claims.

What is claimed is:

1. An insulator configured for installation inside of a cuboid container to insulate the container, the insulator comprising:

an insulation layer comprising a plurality of insulation pads configured to be arranged in an operating position inside the container, wherein the plurality of insulation pads in the operating position form a cuboid shape configured to line a top, a bottom, and four sides of the container when installed inside of the container, such that each of the insulation pads has a contact surface configured to face inward toward contents of the container when installed inside of the container in the operating position, and wherein the plurality of insulation pads comprise a cotton fiber material; and a covering layer comprising a plurality of cover members covering at least the contact surfaces of the plurality of insulation pads, wherein the covering layer is configured to permit the cotton fiber material of each of the plurality of insulation pads to be exposed to an environment within the container, such that the covering layer is configured to permit fluid within the container to bypass the covering layer to contact the cotton fiber material, wherein each of the plurality of insulation pads has an outer surface opposite the contact surface, and the covering layer further covers the outer surfaces of the plurality of insulation pads.

2. The insulator of claim 1, wherein the cotton fiber material is formed from post-industrial, pre-consumer cotton waste, and wherein the insulation layer is biodegradable in an anaerobic environment.

3. The insulator of claim 1, wherein the cuboid shape formed by the plurality of insulation pads in the operating position is a cubic shape having six square panels, and the insulator is configured for installation inside the cuboid container in a cubic configuration where the top, the bottom, and the four sides of the cuboid container are squares.

4. The insulator of claim 1, wherein the plurality of insulation pads comprise a first insulation pad and a second insulation pad each configured to line a portion of an inner periphery of the container when installed in the operating position.

5. The insulator of claim 4, wherein the first insulation pad and the second insulation pad are together configured to line an entirety of the inner periphery of the container when installed in the operating position.

6. The insulator of claim 4, wherein the first insulation pad is folded into a plurality of panels when arranged in the operating position.

7. The insulator of claim 6, wherein the second insulation pad is folded into a plurality of panels when arranged in the operating position.

8. The insulator of claim 6, wherein the panels of the first insulation pad are configured to line a plurality of the four sides of the container when installed inside of the container and arranged in the operating position.

9. The insulator of claim 8, wherein the second insulation pad is configured to line the top of the container when installed inside of the container and arranged in the operating position.

10. The insulator of claim 1, wherein the covering layer is a single layer, such that each of the cover members has a first surface facing the cotton fiber material and a second surface facing away from the cotton fiber material.

11. A method of preparing an insulated container comprising:

providing an insulation layer comprising a plurality of insulation pads formed from a cotton fiber material, each of the plurality of insulation pads having a contact surface, the insulation layer having a covering layer comprising a plurality of cover members covering at least the contact surfaces of the plurality of insulation pads; and installing the insulation layer in an operating position inside a cuboid container having a top, a bottom, and four sides, wherein the plurality of insulation pads in the operating position form a cuboid shape lining the top, the bottom, and the four sides of the container, such that the contact surfaces of the insulation pads face inward toward contents of the container when installed inside of the container in the operating position, wherein the covering layer is configured to permit the cotton fiber material of each of the plurality of insulation pads to be exposed to an environment within the container, such that the covering layer is configured to permit fluid within the container to bypass the covering layer to contact the cotton fiber material, and wherein each of the plurality of insulation pads has an outer surface opposite the contact surface, and the covering layer further covers the outer surfaces of the plurality of insulation pads.

12. The method of claim 11, wherein the container has an inner periphery comprising the top, the bottom, and the four sides, and the plurality of insulation pads comprise a first insulation pad and a second insulation pad each lining a portion of the inner periphery of the container when installed in the operating position.

13. The method of claim 12, wherein the first insulation pad and the second insulation pad are together configured to line an entirety of the inner periphery of the container when installed in the operating position.

14. The method of claim 12, wherein installing the insulation layer comprises folding the first insulation pad into a plurality of panels to arrange the first insulation pad in the operating position.

15. The method of claim 14, wherein the panels of the first insulation pad line a plurality of the four sides of the container when installed inside of the container and arranged in the operating position.

16. The method of claim 15, wherein the second insulation pad lines the top of the container when installed inside of the container and arranged in the operating position.

17. The method of claim 11, wherein the cuboid shape formed by the plurality of insulation pads in the operating position is a cubic shape having six square panels, and the cuboid container has a cubic configuration where the top, the bottom, and the four sides of the cuboid container are squares.

18. An insulator configured for installation inside of a cuboid container having an inner periphery including a top, a bottom, and four sides, to insulate the container, the insulator comprising:

a first insulation pad formed from a cotton fiber material and having a first contact surface, the first insulation pad configured to be installed within the container to line a first portion of the inner periphery of the container, such that the first contact surface is configured to face inward toward contents of the container when installed inside of the container;

a first covering member covering at least the first contact surface of the first insulation pad, wherein the first covering member is configured to permit the cotton fiber material of the first insulation pad to be fluid communication with an environment within the container, such that the first covering member is configured to permit fluid within the container to bypass the first covering member to contact the cotton fiber material of the first insulation pad, and wherein the first insulation pad has a first outer surface opposite the first contact surface, and the first covering member further covers the first outer surface;

a second insulation pad formed from the cotton fiber material and having a second contact surface, the second insulation pad configured to be installed within the container to line a second portion of the inner periphery of the container, such that the second contact surface is configured to face inward toward the contents of the container when installed inside of the container; and a second covering member covering at least the second contact surface of the second insulation pad, wherein the second covering member is configured to permit the cotton fiber material of the second insulation pad to be in fluid communication with the environment within the container, such that the second covering member is configured to permit fluid within the container to bypass the second covering member to contact the cotton fiber material of the second insulation pad, and wherein the second insulation pad has a second outer surface opposite the second contact surface, and the second covering member further covers the second outer surface.

19. The insulator of claim 18, wherein the cotton fiber material is formed from post-industrial, pre-consumer cotton waste.

20. The insulator of claim 18, wherein the first insulation pad and the second insulation pad are together configured to line an entirety of the inner periphery of the container when installed within the container.

21. The insulator of claim 18, wherein the first insulation pad is folded into a plurality of panels when arranged to be installed within the container.

22. The insulator of claim 21, wherein the second insulation pad is folded into a plurality of panels when arranged to be installed within the container.

23. The insulator of claim 21, wherein the panels of the first insulation pad are configured to line a plurality of the four sides of the container when installed inside of the container.

24. The insulator of claim 23, wherein the second insulation pad is configured to line the top of the container when installed inside of the container.

25. The insulator of claim 18, wherein the first covering member and the second covering member are single layers, each having a first surface facing the cotton fiber material and a second surface facing away from the cotton fiber material.

* * * * *